Dec. 20, 1938. D. G. BRANDT Re. 20,951
PROCESS AND APPARATUS FOR PRESSURE DISTILLATION
Original Filed July 23 1926
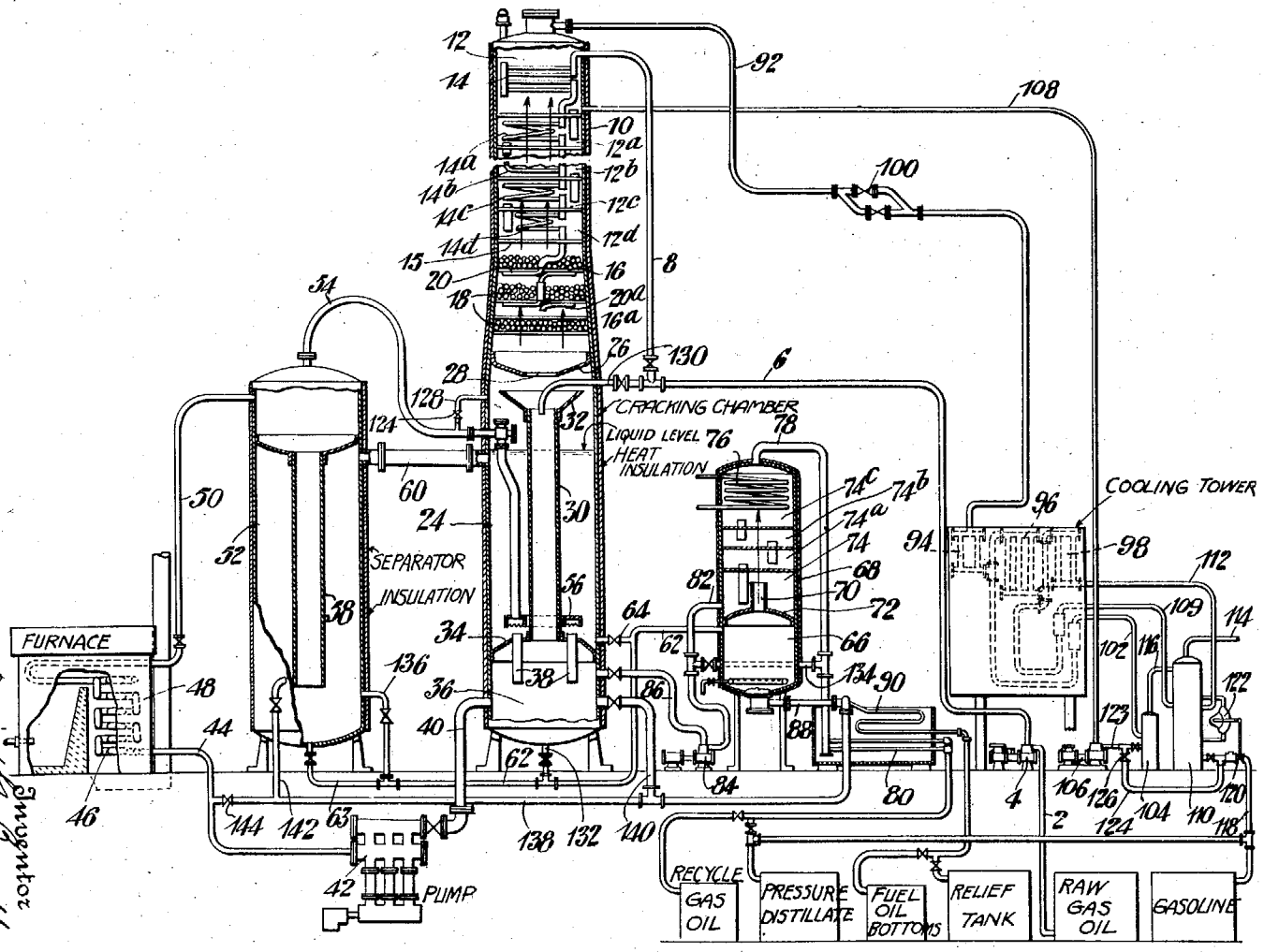
Inventor
David G. Brandt
By His Attorney
Edmund G. Borden Reissued Dec. 20, 1938

Re. 20,951

UNITED STATES PATENT OFFICE 20,951

PROCESS AND APPARATUS FOR PRESSURE DISTILLATION

David G. Brandt, Westfield, N. J., assignor, by mesne assignments, to Power Patents Company, Jersey City, N. J., a corporation of Maine Original No. 2,074,120, dated March 16, 1937, Serial No. 124,320, July 23, 1926. Application for reissue August 16, 1938, Serial No. 225,247

12 Claims. (Cl. 196—48)

The present invention relates to the cracking of heavier hydrocarbons to obtain lighter hydrocarbons therefrom and more particularly to obtain from gas oil or like material a finished motor spirit or gasoline. The invention of the present application is an improvement upon my prior pending applications Serial No. 710,996 and Serial No. 654,532, filed May 5, 1924, and July 30, 1923, respectively the last of which has matured into Patent No. 1,872,879, August 23, 1932.

In my said prior applications, I have disclosed a process and apparatus for the pressure distillation of relatively heavy hydrocarbons to obtain pressure benzine therefrom, said prior applications disclosing passing charging stock of the character of gas oil, or the like into a cracking chamber. A mixture of hydrocarbons is then withdrawn from the cracking chamber and forced through a pipe still or heating coil where the mixture is heated to cracking temperature. From the pipe still the heated oil is discharged into a separating chamber wherein the liquids and vapors separate and both the liquids and vapors are taken from said separator into a vertical cracking chamber in which the vapors are passed in countercurrent relation to the liquids while still at cracking temperature and under presure to complete the cracking reaction. Vapors from said cracking chamber are passed through a dephlegmator, the reflux from which is run back into the cracking chamber and uncondensed gases and vapors from which are passed through a pressure controlling and reducing valve and thence to a condenser. My prior application Serial No. 532,954, filed January 31, 1922, which has matured into Patent No. 1,784,087, December 9, 1930, discloses also drawing off heavy liquid from the bottom or lower portions of said cracking chamber and relieving pressure thereon to permit the heat contained in the liquid so drawn off to drive over a pressure distillate which is condensed, the residiuum liquid resulting after the pasing off of said distillate being used for fuel or other purposes.

Certain objects of the present invention are improving the results obtained from my said prior processes and apparatus by controlling the circulation of the liquids in said vertical cracking chamber to prevent the mixing of the feed with the liquid from the separator within the cracking chamber proper to obtain a finished gasoline from a cracking plant; and to conserve and return to the process part of the heat formerly lost in the residuum drawoff.

The novel features of the present invention are pointed out with particularity in the appended claims. The invention itself, however, together with further objects and advantages, will best be understood from the following description taken in connection with the accompanying drawing in which The figure is an elevational view, partly diagrammatic in character, of an apparatus adapted to operte in accordance with the method or process of the present invention and including the novel features hereinafter described and claimed.

In the apparatus illustrated in the drawing, raw charging stock, preferably gas oil, is brought in through pipe 2 to the feed pump 4 and thence forced through pipes 6 and 8 to the upper portion of a tower 10 combining the functions of a heat exchanger, a bubble cap tower and a dephlegmator. The pipe 8 enters a chamber 12 at the top of the tower 10 and the oil thereupon passes through a coil or heat exchanger 14 within chamber 12 and thence through coils **14*a*, 14*b*, 14*c* and 14*d* in the chambers 12*a*, 12*b*, 12*c* and 12*d* arranged below the chamber 12 in the tower 10 and in the order mentioned in going from the top to the bottom of the tower. The chambers 12, 12*a*, 12*b*, 12*c* and 12*d* inclusive, and if desired others of like character not illustrated, comprise the bubble-cap or tray section of the tower 10 through which reflux passes downwardly from one chamber to the other and vapors pass upwardly as indicated by arrows in counterflow to the reflux in a well-known manner, this type of apparatus being so well-known that the details of the bubble caps are omitted from the drawing. It will be seen that the bubble cap section of the tower 10 according to the present invention differs from the standard bubble cap apparatus primarily in that the chambers of the individual trays of the bubble cap section of tower 10 include coils 14, 14*a*, 14*b*, 14*c*, 14*d* in contact with the vapors in the chambers and through which the ingoing charging stock passes in series, these coils thereby acting as heat exchangers, heating the ingoing stock at the same time that they condense a portion of the rising and outgoing vapors to increase the reflux condensate normally formed in such apparatus. Below the chamber 12*d*, tower 10 comprises two or more dephlegmating chambers 16, to which vapors pass in series on their way to the bubble cap section of the tower 10. Owing to the character of chamber 16 the bottom 15 of chamber 12*d*** is not of the bubble-cap type but is perforated substantially uniformly to act as distributor for reflux liquid passing down thru it. Chambers 16 are partly filled with fragments 18 of glass, coke or other inert material to increase the dephlegmating effect. The lumps or fragments 18 rest on horizontal perforated partitions supported within tower 10 at the lower ends of the chambers 16. Lower chamber 16 contains also coil 20 through which the charging stock passes after leaving the coil 14b previously mentioned, coil 20 having the same function as the coils 14, 14a, etc. in the upper portion of tower 10. Directly below the lower chamber 16 is a chamber 16a in which is mounted a coil 20a similar to and connected in series with the coil 20. The stock being charged into the apparatus through coils 14, etc., 20 and 20a is discharged into the chamber 16a where it is mixed with reflux flowing down into chamber 16a from upper chambers in the tower 10 as well as with that formed in chamber 16a. The bottom of the chamber 16a is formed of two perforated plates spaced apart, the space being filled with fragmentary material 18 of the type referred to above. This arrangement causes intimate contact over an extended area, of the vapors entering and the liquids leaving the tower 10.

The dephlegmating tower 10 preferably is set on top of a heat insulated cracking chamber 24, there being a frusto-conical plate 26 at the bottom of tower 10 and separating the tower from the cracking chamber 24. The plate or partition 26 has a central aperture 28 through which reflux condensate from the tower discharges into the cracking chamber. Charging stock after passing through the coil 20a and mixing with reflux in chamber 16a is discharged downward centrally through the opening 28 into the cracking chamber along with the reflux condensate. The cracking chamber 24 contains a considerable body of material which has been either cracked previously or is undergoing cracking and, according to the present invention, it is desired to prevent the reflux from tower 10 and the charging stock from mixing immediately with such material in chamber 24 until the material in the chamber has substantially completed the cracking action obtainable without reheating. According to the present invention therefore, a central conduit 30 of large dimension is set vertically beneath the aperture 28 to receive the reflux and charging stock coming down through the aperture. Preferably conduit 30 carries at its upper end funnel-shaped mouth 32 for receiving the reflux and charging stock and guiding it into the conduit 30. Below the chamber 24 and spaced therefrom by a diaphragm 34 is a mixing chamber 36 and conduit 30 extends through the diaphragm 34 so as to conduct the mixed reflux and charging stock through chamber 24 and into the mixing chamber 36 before the charging stock and reflux can mix with the material from chamber 24. Material which has undergone cracking in chamber 24 passes from the lower end of said chamber into the mixing chamber 36 through pipes 38, 38. The mixture of reflux, charging stock and previously cracked material, in the proportions of about 60% previously cracked stock to 20% fresh stock and 20% reflux, is taken out of chamber 36 through pipe 40, returned to the system and forced by pump 42 through pipe 44 to a pipe still or heating coil 46 contained in the furnace 48. Any gas oil obtained as described below by separating it from liquid taken out of chamber 24 is included in the 20% fresh stock just mentioned. Ordinarily, the liquid passing through coils 14a, 14b, etc., in tower 10 is only 10% of the liquid entering pipe-still 40 from pump 42 and is seldom more than 20%. In most aspects however, the present invention is independent of the ratio between the liquid flowing through coils 14a, 14b, etc., and that pumped into pipe-still 46. In the coil 46, the oil is heated to between 750° and 900° F. under considerable pressure and discharged through pipe 50 to the upper portion of the separator 52. Vapors from separator 52 pass out of the top of the separator through pipe 54 which passes through the side of the cracking chamber 24 and discharges into a distributor 56 near the bottom of the cracking chamber. Liquids entering the separator 52 pass to the lower portion of the separator through the interior of conduit 58 and the majority of these liquids leave the separator through a pipe 60 which passes through the side of the chamber 24 somewhat above the mid-level of the liquids therein and discharges directly into the chamber. The liquid discharged from pipe 60 thereupon works its way downwardly through the chamber 24 while undergoing further cracking and in a general way countercurrent to the vapors and gases discharged from the distributor 56. The majority of the liquids flowing downwardly in the chamber 24 as just mentioned and remaining unvaporized passes through the pipes 38, 38 into the mixing chamber 36.

It has been found that the cracking reaction is one requiring an appreciable amount of time in which to complete itself. If the cracking reaction initiated by a given heating of the oil has not been permitted to complete itself before the oil is returned to the cracking coil, the oil which has not completed its cracking from a previous heating is almost sure to crack in the pipe still when returned thereto. The excessive cracking of the oil in the pipe still is undesirable, not only because of the carbon which may thereby be deposited in the pipestill, but because of poor utilization of the heat imparted to the oil if the cracking has not been completed in the chamber 24. The capacity of the separator chamber 52 is preferably made such that the oil is held in chamber 52 until it is "conditioned", or about to crack, before being transferred to chamber 24. The oil as introduced into chamber 24 being about to crack, the contact of the hot oil with the hot gases coming from the top of separator 52 and distributed through the oil in chamber 24 by the distributor 56 produces a rapid cracking action in the chamber 24. Moreover, the distributor 56 being adjacent the outlet from chamber 24 any oil leaving this chamber must come into contact with the hottest gases, thus insuring that any molecule of the oil which has absorbed enough heat in coil 46 to the chemically unstable will crack before leaving chamber 24. The heat delivered to the oil in the pipe still is therefore effectively utilized in chambers 52 and 24 and very high firing rates can be applied to the pipe still without depositing an objectionable amount of carbon in the coil 46. The capacity of the apparatus is therefore very high for a given area of heating surface in the coil 46. In addition to the advantages just discussed, the gases and vapors delivered to the lower part of chamber 24 by the distributor 56 and rising through the liquid in the chamber strip out of the liquid undergoing cracking in the chamber substantially all of the gasoline-like material in this chamber. The formation of gasoline-like material in the oil heated in pipe still 46 is therefore promoted to a maximum degree owing to the substantial absence of any gasoline-like material in the feed to the still. In this connection, experience has shown that a partial pressure of gasoline in material being heated to cracking temperature correspondingly reduces the amount of gasoline formed by a given heating.

It is necessary that a certain amount of liquid be withdrawn from the cracking still, not only to prevent the liquid level in the apparatus from becoming too high but also to maintain the proper quality of the liquid in the cracking circuit for optimum conditions of operation. I have found that processes and apparatus employing a cracking circuit according to my said prior applications are operated with a minimum of difficulty while at the same time giving large yields of gasoline when substantially no free carbon can be detected in the liquid in the chamber 24. This is not to be taken to mean that no carbon forms in chamber 24, as the metal surfaces within this chamber which are exposed to the hot oil accumulate a layer of crystalline carbon, the metal seemingly catalyzing the separation of carbon from the liquid undergoing cracking. Nevertheless the liquid itself within the chamber 24, under the conditions desired according to the present invention, contains practically no free carbon.

In order to maintain the desired condition of the liquid as to free carbon which has just been mentioned, the shell of chamber 24 moreover is tapped slightly above diaphragm 34 and an outlet pipe 62 connected into the shell at this level through which residuum may be drawn off at the rate desired from the chamber 24, the flow of liquid through pipe 62 being regulated by valve 64.

It is observed, moreover, in order to maintain the optimum operating conditions in the cracking circuit that some of the heavy residuum should be withdrawn from the bottom of the separator 52. For this purpose, the valved pipe 63 is led out of the bottom of separator 52, pipe 63 connected with the pipe 62 through which residuum is taken from chamber 24.

While, according to the present invention, it is desired to prevent the formation of free carbon mixed with the liquid in the chamber 24, the presence of a small amount of free carbon in the liquid taken out of the bottom of separator 52 through pipe 63 is not harmful. As a general rule, the oil passing through pipe 62 to the concentrator is made up of about 60% of material taken from the bottom of the cracking chamber 24 and about 40% of material from the separator 52, although all of it may be withdrawn from 24 or 52.

Pipe 62 delivers liquid into chamber 66 in the bottom of a concentrator 68. The pressure in concentrator 68 is substantially reduced as compared to that in the chamber 24 and gasoline and gas oil contained in the liquid entering chamber 66 are thereby permitted to evaporate under the reduced pressure and due to the heat contained in the incoming liquid itself.

For instance, if chamber 24 is at 250 lbs. gage pressure, concentrator 68 is operated at about 50 lbs. gage to give a certain gravity to the residuum withdrawn from chamber 66. The proper pressure to hold in chamber 66, therefore, varies with the pressure and temperature in chamber 24 as well as with the grade of residuum or fuel oil desired. Moreover, when a fuel oil is desired of a gravity heavier than that readily obtainable merely by reduction of pressure under the conditions prevailing at a given time, steam or gas may be introduced into the lower part of chamber 66 to assist vaporizing liquid in this chamber. Vapors formed in chamber 66 pass out of the chamber through the opening 70 in the diaphragm 72 which forms the top of the chamber 66. The vapors from opening 70 pass into a bubble cap tower comprising chambers 74, **74*a*, 74*b* and 74*c* in the upper part of the concentrator 68. The bubble cap portion of the concentrator comprises bubble cap sections or trays which may be of standard or other preferred design and the details of which are not illustrated. It will be understood, however, that the vapors pass up through chambers 74, 74*a*, 74*b* and 74*c*, the heavy vapors being condensed and flowing as a reflux back into chamber 74. To assist in the formation of reflux and to prevent any vapors heavier than gasoline from passing out of concentrator 68, a cooling coil 76 is placed in the top of the chamber 74*c*. Gasoline vapors passing the coil 76 are taken out of the top of the concentrator 68 through pipe 78 and passed thence through condenser 80 to suitable storage tanks. Reflux condensate, however, formed in bubble cap sections 74, 74*a*, 74*b* and 74*c*, is not permitted to flow back into chamber 66 at the bottom of the concentrator 68 but, owing to the form given the diaphragm 72, and the outlet 70 therethrough, is trapped in the lower portion of the chamber 74 from which the condensate, consisting principally of gas oil may be drawn out through pipe 82 and forced by pump 84 back through pipe 86 into the mixing chamber 36 mentioned above. By the arrangement and method just described, much of the heat of the residuum drawn from the bottoms of chambers 24 and 52 may be returned to the cracking circuit with the gas oil or the like from concentrator 68. The gas oil from chamber 74 may, of course, be stored and mixed with or used in place of gas oil from other sources. On the other hand the portion of the liquid from the lower part of chamber 24 which enters the chamber 66 and which does not vaporize at the pressure and temperature in chamber 66 is taken out of the lower part of this chamber through pipe 88 and passes through a cooler 90** from which it is taken to suitable storage. This liquid is a fuel oil.

In the operation of valve 64 and the valve in pipe 63 to admit liquid into chamber 66 from the cracking chamber 24, and the separating chamber 52, it is preferred that the valves be opened to their fullest extent whenever liquid is to be passed through them and closed tight again as soon as the desired amount of liquid has been withdrawn through them. I have found that this way sticking of valve 64 and of the valve in pipe 63 is avoided. When these valves are only cracked open to permit the desired amount of liquid to flow through them continuously, the valves soon become inoperative due to gum and carbon adhering to them and to their seats.

Gases and vapors liberated from the surface of the oil in chamber 24 pass through the aperture 28 and into the dephlegmator 10. Here the vapors are dephlegmated, the dephlegmating action due to the outer surface of tower 10 being assisted both by the cooling of the vapors by the coils 14, **14*a*, 14*b*, 14*c*, 14*d*, 20, and 20*a* previously mentioned and by pumping a volatile liquid such as gasoline into the chamber 12 of tower 10**. The design and arrangement of the coils 14, 14a, 14b, 14d, 20, and 20a is such that the dephlegmating action is least in the section of tower 10 in which the vapor temperature is highest and is increased by steps to the section or chamber of the tower 10 in which the vapor temperature is lowest. It will be seen, moreover, that the increase in dephlegmating effect in the direction of decreasing temperatures in tower 10, in other words, in the direction of flow of the vapors being dephlegmated, is as specifically disclosed, a product of three factors; namely, the increasing area of the coils 20a, 20, etc., in the direction of flow of the vapors, the decreasing temperature of the raw liquid in the coils 20a, 20, etc., and the volatile liquid injected into the uppermost chamber 12 of tower 10. By thus graduating the dephlegmating effect and increasing it in the direction of flow of the gases, the temperature at the lower or hotter end of tower 10 may be at a maximum temperature, with minimum of reflux at this point, thus producing optimum conditions for the escape of gasoline from the cracking chamber 24 both as to temperature and as to reduction of mechanical entanglement of gasoline vapors in the reflux. The temperature at the upper end of tower 10 is, however, maintained such that no vapors heavier than those of commercial gasoline pass out of tower 10, and I am thus enabled to produce commercial or "end-point" gasoline direct from the vapors of a cracking chamber without rerunning the distillate to eliminate heavy ends as is now the practice.

Of course it is impossible to maintain an absolutely constant rate of cracking in chamber 24. The dephlegmating effect of tower 10 must therefore be varied to produce the desired end point gasoline. The variation of the cooling effect in tower 10 required by variations in the rate of cracking in the chamber 24 is obtained by varying the amount of gasoline pumped back into the chamber 12.

It has been found possible to attain the desired results as to the temperature in the tower 10 and particularly in the upper end thereof by automatically controlling the speed of the pump 106 which returns gasoline to the tower in accordance with the temperature of the vapors passing from the tower to the condenser. A satisfactory method and arrangement for operating pump 106 in accordance with the temperature of the vapors in tower 10 is disclosed in my prior application No. 654,532, filed July 30, 1923. However, I do not limit myself to automatic control of pump 106 as this pump may be controlled by hand within the present invention. These vapors pass through an offtake pipe 92, containing a pressure-maintaining valve 100, valve 100 preferably being in duplicate so that one may be used if the other is out of order. It has been found moreover according to the present invention, that maintaining the temperature in the top of the tower 10 at the point producing by condensation a given end point gasoline from the vapors which have passed therefrom, also automatically maintains the pressure in the dephlegmator 10 substantially constant and avoids the necessity of adjusting the valve 100 during the normal operation of the apparatus. Maintaining a constant pressure in tower 10 also of course automatically maintains substantially constant pressures throughout the other parts of the apparatus.

Vapors not condensed in dephlegmator 10 pass out of the top thereof through pipe 92 to condensers 94, 96 and 98 through which the vapors pass in series. Intermediate tower 10 and condenser 94, the pressure is reduced by controlling valve 100 previously mentioned. Condenser 94 is the first condenser through which vapors from pipe 92 pass. Gasoline condensed in condenser 94 passes through pipe 102 to a container 104. Vapors uncondensed in the condenser 94 then pass through the condenser 96 and finally through condenser 98. Condensate from condenser 96 passes through pipe 109 to container 110 and vapors, condensate and gases from condenser 98 pass through pipe 112 to container 110. Uncondensed gases and vapors pass off from the receiving tank or container 110 through pipe 114. Gas or vapors from container 104 also may pass through pipe 116 into the top of container 110 and thence off through pipe 114. Pipe 114 may lead to burners or to other means for utilizing the gas and uncondensed vapors. Preferably the gas in pipe 114 is scrubbed for gasoline before being utilized. Gasoline from tank 110 is run to gasoline storage through pipe 118, the flow through pipe 118 being conveniently regulated by an automatic valve 120 operated by a float in chamber 122.

As mentioned above, the satisfactory control of the dephlegmating effect in tower 10 and more particularly the control of the dephlegmating effect in the top chamber of the dephlegmator has been found to be best achieved by introducing into chamber 12 a varying amount of gasoline of the end point it is desired to make in the apparatus. For this purpose a pump 106 is provided whose intake is connected by pipe 123 with the tank 104. Pump 106 forces gasoline received by it from pipe 123 into chamber 12 through pipe 108 to maintain a constant end point on the gasoline formed from the vapors leaving chamber 12. The necessary variations in the amount of gasoline pumped to dephlegmator 10 to compensate for changes in the vapor flow therethrough are readily produced by thermostatic control of the speed of pump 106, a thermostat (not shown) for this purpose being connected into the vapor line 92.

Liquid gasoline from the condenser has a cooling effect when introduced into tower 10 due both to its temperature and to its vaporization at the temperatures in the tower. The gasoline from tank 104 moreover, is preferably introduced into chamber 12 in sufficient quantity so that a considerable portion of it does not vaporize in chamber 12 when pumped thereinto, but runs down into chambers below chamber 12 before vaporizing. Advantage is therefore taken in the design of dephlegmator or tower 10 of the cooling effect of the heavy gasoline from condenser 94 when pumped back into the chamber 12 by correspondingly reducing the size of the cooling coils in the chambers below the top tray.

All the gasoline from condenser 94, however, is not required to be put back into chamber 12 and gasoline from tank 104 not used by pump 106 flows through valve 126 in pipe 124 to pipe 118 and thence to storage. Similarly, gasoline from condensers 96 and 98 collects in tank 110 and flows from this tank to storage through pipe 118. A valve 120 in pipe 118 is controlled by a float in float tank 122 connected to tank 110, so as to maintain a substantially constant level of gasoline in tank 110.

In addition to the pipe connections previously mentioned as used in the operation of the apparatus and process according to the present invention, there are illustrated in the drawing certain pipe connections used only on particular occasions. For instance, the vapor line 54 leading from the top of the separator chamber 52 to the cracking chamber 24 has a branch pipe 128 connected thereto and leading into the chamber 24 above the normal liquid level in chamber 24 and whereby the pressure above the liquid in chambers 24 and 52 may be equalized when it is desired to draw out the liquid in the chambers when for any reason the apparatus is shut down. A valve 129 is provided in the pipe 128 normally preventing passage of vapors through the pipe. Moreover, the feed line 6 for the raw oil has a pipe connection 130 passing through the side of the chamber 24 above the conduit 30 and arranged to deliver more or less of the feed into the upper end of the conduit 30 whenever for any reason it is not desired that the entire feed pass through the cooling coils 14, 14*a* and 14*b*, etc., and tower 10. Also, special draw-offs are provided from chambers 36 and 52 for taking out liquid from the lower ends of these chambers whenever it is desired to drain the liquid from these chambers. For this purpose valved pipe 132 leads from the bottom of chamber 36 connecting with the pipe 62 and valved by-pass 134 connects the pipe 82 with pipe 78 for permitting reflux collecting in chamber 74 to pass into a recycle gas oil tank. Similarly a valved pipe 136 is connected into the lower end of chamber 52 and arranged to deliver to pipe 62. Another way of discharging oil from chambers 36 and 52 is provided by a pipe 138 connected at one end to a pipe 88 and coil 90, connection being provided from the coil 90 to a relief tank. When desired, liquid may be discharged from chambers 36 and 52 into pipe 138 and thence into the relief tank through valved pipe connections 140 and 142 respectively. Moreover, provision is made whereby, when desired, some or all of the liquid going through the pump 42 may be circulated through the chambers 52, 24 and 36 without passing through the pipe coil 46. The arrangement for this purpose comprises a connection between the pipes 138 and 44 including a valve 144. By opening the valve 144 and the valves in pipes 140 and 142 (when flow from pipe 138 to pipe 88 is cut off), the pump 42 may be kept in operation while little or no cracking is being carried out. It is preferred, moreover that the valves in pipes 132 and 136, as well as other valves which may be used to draw off partially cracked material from chambers 24 and 52 during the normal operation of the apparatus shall be operated like valve 64 so as to be open to the fullest extent when it is desired to draw off liquid and to close them tight at other times.

While an apparatus according to the present invention and adapted to operate in accordance with the process of the present invention is illustrated in the accompanying drawing and described herein in detail, it should be understood that such detailed disclosure is illustrative only and is not intended as limiting the scope of the appended claims.

The separator and cracking chamber have been shown as being insulated. The usual practice for cracking stills is to insulate all equipment including pipe lines which handle hot oil. This insulation is not illustrated in the drawing for the sake of clearness.

Having thus described my invention, I claim:

1. In an apparatus of the class described, a cracking chamber, a mixing chamber connected to the lower end of said cracking chamber, a dephlegmator set over said cracking chamber and receiving vapors therefrom, a central conduit in said cracking chamber, the upper end of which stands above the normal level of liquid in the chamber and the lower end of which connects directly with said mixing chamber, and means whereby reflux from said dephlegmator and fresh stock charging liquid pass directly into said conduit.

2. The method of treating a relatively heavy hydrocarbon oil to produce a relatively light hydrocarbon therefrom comprising heating said relatively heavy hydrocarbon to cracking temperature while under pressure, removing said heated hydrocarbon from the heating conditions and permitting it to crack under insulating conditions from heat previously stored therein, distilling a portion of said cracked hydrocarbon to produce a gas oil and a fuel oil, dephlegmating vapors produced by said cracking reaction, preheating oil by said vapors, withdrawing residual hydrocarbon from that undergoing cracking and mixing it with additional hydrocarbon for heating to continue the process, the mixtures so formed comprising 10% of stock preheated by the vapors undergoing dephlegmation, 20% of liquid reflux obtained by dephlegmating said vapors, and 10% of said gas oil derived by distillation from previously cracked material.

3. The process of cracking high boiling point hydrocarbons to produce relatively low boiling point constituents of the nature of gasoline, which comprises maintaining a body of high boiling point hydrocarbons in a cracking zone under cracking conditions of temperature and pressure, subjecting the vapors evolved from the hydrocarbons in said zone to reflux condensing conditions to separate high boiling point constituents from relatively lower boiling point constituents, passing the reflux condensate produced into a charge mixing zone, withdrawing heavy liquid hydrocarbon material from said cracking zone into a single vaporizing zone and vaporizing substantial portions thereof under a substantially reduced pressure by heat contained therein, subjecting the resulting vapors to reflux condensing conditions and passing the resulting reflux condensate free of the resulting unvaporized residue in said vaporizing zone into said mixing zone, withdrawing oil mixture from said mixing zone and forcing it under a superatmospheric pressure through a heating zone in which the oil is heated to a cracking temperature, and passing the resulting highly heated products into the body of oil in said cracking zone.

4. In the process of cracking hydrocarbon oils including heating a relatively heavy hydrocarbon oil to cracking temperature under pressure, in which relatively high-boiling oil constituents previously subjected to cracking conditions are admixed with fresh stock and the resulting mixture circulated in a closed cycle including a heating zone maintained under cracking conditions of temperature and superatmospheric pressure, the improvement which comprises withdrawing a portion of said mixture being circulated into a single vaporizing zone and substantially reducing the pressure thereon to permit the heat contained therein to vaporize all of the oil constituents desired to be separated from said withdrawn mixture, dephlegmating the vapors formed to permit separation of gasoline vapors from the remainder of the vaporized material by reflux condensation, and passing the reflux condensate from such dephlegmation step free of the resulting unvaporized residue in said vaporizing zone to said circulating mixture.

5. The method of converting higher boiling hydrocarbon oils into lower boiling hydrocarbon oils which comprises heating such oil to a temperature of at least 750° F. while maintaining it under a high superatmospheric pressure, passing the highly heated oil to a zone of lower superatmospheric pressure wherein the desired low boiling products together with a portion of the products heavier than the desired products are vaporized by the contained heat of the oil and the unvaporized products are maintained at a temperature sufficient to effect rapid cracking thereof, separately withdrawing the vaporous and unvaporized products, passing the unvaporized products upon completion of the desired cracking thereof from said low pressure zone to another zone of still lower pressure wherein substantially all of the remaining heavier constituents thereof desirable as cracking stock are vaporized by the contained heat of the said products without further subjecting the said unvaporized products to cracking conditions, separately withdrawing the vaporous and unvaporized portions, subjecting the vaporous products from said second-named low pressure zone to a reflux condensing operation to separate the heavier constituents, passing the resulting reflux condensate to the oil undergoing heating and cracking, subjecting the vapors from said first-named low pressure zone to a condensing operation to separate condensible constituents from uncondensible gas, and passing gas through the unvaporized product in said second-named low pressure zone before the latter product is withdrawn therefrom.

6. The method of converting higher boiling hydrocarbon oils into lower boiling hydrocarbon oils which comprises heating such oil to a temperature of about 900° while maintaining it under a superatmospheric pressure of at least 250 lbs. per square inch and thereafter conducting it in highly heated condition to a zone of lower superatmospheric pressure wherein desired low boiling products together with a portion of the products heavier than the desired products are vaporized by the contained heat of the oil, and the unvaporized products are maintained at a temperature sufficient to effect rapid cracking thereof, separately withdrawing resulting vapors and unvaporized products from said zone, passing said withdrawn unvaporized products upon completion of the desired cracking thereof from said lower pressure zone to another zone of still lower pressure wherein substantially all of the remaining heavier constituents thereof desirable as cracking stock are vaporized by the contained heat of the said withdrawn unvaporized products without further subjecting the said unvaporized products to cracking conditions, separately withdrawing the vaporous and unvaporized portions from said last-named zone, subjecting the vaporous products from said second-named lower pressure zone to a reflux condensing operation to separate the heavier constituents, passing the resulting reflux condensate to the oil undergoing heating and cracking, subjecting the vapors from said first-named zone of lower pressure to a fractionating operation wherein the heavier constituents thereof are condensed as reflux condensate, passing the said reflux condensate to the oil undergoing heating and cracking, subjecting the fractionated vapors to a condensing operation to separate lower boiling oils from uncondensible gases, and passing gas through the unvaporized product in said second named zone of lower pressure before the latter is withdrawn therefrom.

7. The method of converting higher boiling hydrocarbon oils into lower boiling hydrocarbon oils, which comprises heating such oil to a temperature of from 750° to 900° F. while maintaining it under a considerable superatmospheric pressure, thereafter conducting the highly heated oil to a zone of lower superatmospheric pressure wherein desired low boiling point products as well as products of higher boiling point are vaporized because of the heat contained in the oil introduced into said zone, maintaining the unvaporized oil products in said zone at a substantial superatmospheric pressure and at a temperature sufficient to effect rapid cracking thereof, separately withdrawing vapors and unvaporized products from said zone, passing the withdrawn unvaporized products upon completion of the desired cracking thereof from said zone into a zone of substantially lower pressure wherein substantially all of the heavier constituents thereof suitable as cracking stock are vaporized by the contained heat of the said withdrawn unvaporized products without further subjecting the said unvaporized products to cracking conditions, separately withdrawing the vapors and unvaporized constituents from said last-named zone and subjecting the vapors to a fractionating operation in which the higher boiling constituents of the vapors are condensed to produce a reflux condensate suitable as cracking stock, passing said reflux condensate to the oil undergoing heating and cracking, subjecting the vapors from said first-mentioned zone to a fractionating operation in which the higher boiling constituents of the vapors are condensed as reflux condensate, passing said reflux condensate to the oil undergoing heating and cracking, subjecting the fractionated vapors to a further condensing operation to produce a final condensate and uncondensed gases, and passing a gas through the unvaporized product in said second-named zone before the latter is withdrawn therefrom.

8. The process of converting higher boiling point hydrocarbon oils into oils of lower boiling point, which comprises passing such oil in a confined stream of restricted cross section through a heating zone in which it is heated to a cracking temperature of from 750° to 900° F., maintaining a superatmospheric pressure greater than 250 lbs. per square inch on the highly heated oil products discharged from said zone and conducting the products into an enlarged separating chamber in which vapors are permitted to separate from unvaporized oil constitutents, passing separated unvaporized oil constituents into the upper portion of an enlarged cracking zone in which an enlarged body of oil is maintained at a lower pressure and at a cracking temperature sufficiently high to effect rapid cracking of the oil, maintaining a pressure of approximately 250 lbs. per square inch in said cracking zone, passing the separated vapors from said enlarged separating chamber into the lower portion of said enlarged cracking zone in intimate contact with the body of oil therein, fractionating the vapors evolved in said enlarged cracking zone to produce a reflux condensate, a final desired distillate and uncondensible gases, withdrawing liquid oil residue upon completion of the desired cracking thereof from said enlarged cracking zone into a single vaporizing zone of substantially lower pressure in which oil constituents suitable for cracking stock as well as lower boiling constituents are vaporized by the contained heat of the liquid oil residue introduced into said zone without further subjecting the said liquid oil residue to cracking conditions, removing the residue remaining unvaporized in said vaporizing zone directly from the cracking system, fractionating the vapors produced in said vaporizing zone to form a reflux condensate suitable as a cracking stock and lower boiling condensate, passing said reflux condensates to the oil being heated in said stream, and introducing gas into the unvaporized residue in said vaporizing zone to aid in the vaporization and removal of constituents desirable as cracking stock and lower boiling products.

9. The process of cracking higher boiling hydrocarbon oils into oils of lower boiling point, which comprises passing such oil in a confined stream of restricted cross section through a heating zone in which the oil is heated to a cracking temperature of from 750° to 900° F., maintaining a considerable superatmospheric pressure on the oil being heated in said zone, discharging the highly heated oil constituents from said zone into an enlarged vapor separating chamber in which vapors are permitted to separate from unvaporized liquid oil constituents, removing the vapors from said separating chamber and fractionating them to produce a reflux condensate, a final desired condensate and uncondensible gases, draining the unvaporized liquid oil constituents from the lower part of said separating zone and passing them into an enlarged body of liquid oil maintained at a cracking temperature and at a lower but substantial superatmospheric pressure in an enlarged cracking zone, withdrawing liquid oil residue upon completion of the desired cracking thereof from said enlarged cracking zone into a single vaporizing zone of substantially lower pressure in which constituents desirable as cracking stock as well as lower boiling desirable constituents are vaporized by the contained heat of the residue introduced into said vaporizing zone without further subjecting the said residue to cracking conditions, removing the residue remaining unvaporized in said vaporizing chamber directly from the cracking system, separately fractionating the vapors evolved in said vaporizing zone to produce a reflux condensate suitable as cracking stock and a desirable low boiling condensate, conducting said reflux condensates to a charge mixing zone and passing the resulting mixture to said heating zone, and introducing a gas into the unvaporized residue in said vaporizing zone to aid in the vaporization of the constituents desired to be separated from the residue introduced thereinto.

10. The process of converting higher boiling hydrocarbon oils into oils of lower boiling point of the type of gasoline, which comprises passing the oil to be converted in a stream through a fractionating tower in indirect heat exchange with vapors produced in the cracking operation thereby preheating the oil to be cracked, passing the preheated oil charging stock into a hot oil supply chamber and passing oil from said chamber at a high superatmospheric pressure in a confined stream of restricted cross section through a long heating zone in which the oil is heated to a temperature of approximately 750° to 900° F. and in which the oil is subjected to cracking conditions under a considerable superatmospheric pressure, discharging the stream of oil from said heating zone into an enlarged vapor separating chamber in which the vapors formed by the heating in said zone are permitted to separate from unvaporized liquid oil, maintaining a substantial superatmospheric pressure in said enlarged separating chamber, removing the separated vapors from the said separating chamber and conducting them into said fractionating tower in which a heavy reflux condensate is formed, discharging uncondensed vapors from said tower and condensing a gasoline condensate therefrom and separating the same from uncondensible gases, draining the separated liquid oil constituents into the lower part of said separating chamber as such liquid constituents separate from the hot oil mixture entering the chamber and removing such liquid constituents therefrom, passing unvaporized oil constituents removed from said separating chamber upon completion of the desired cracking thereof into a single vaporizing chamber maintained under a pressure substantially lower than the pressure maintained in said separating chamber whereby substantial proportions of the unvaporized oil introduced thereinto suitable as cracking stock are vaporized by the contained heat of the unvaporized oil without further subjecting said unvaporized oil to cracking conditions, removing the residue remaining unvaporized in said vaporizing chamber directly from the cracking system, passing the vapors from said vaporizing chamber into a second fractionating tower and fractionating them under refluxing conditions by cooling the vapors in the upper part of the tower whereby a relatively high boiling reflux condensate suitable as a cracking stock is condensed, passing high boiling reflux condensate from said second tower into said hot oil supply chamber, conducting uncondensed vapors from said second tower and condensing them to form a gasoline distillate.

11. The process defined by claim 10 in which the reflux condensate produced in said first-mentioned fractionating tower is passed while hot into said hot oil supply tank and thereafter conducted to the heating zone with the preheated charging stock.

12. The process of converting higher boiling hydrocarbon oils into oils of lower boiling point of the type of gasoline, which comprises passing the oil to be converted in a confined stream of restricted cross section through a long heating zone in which the oil is heated to a temperature of approximately 750° to 900° F. and in which the oil is subjected to cracking conditions under a considerable superatmospheric pressure, discharging the stream of oil from said zone into an enlarged chamber in which the vapors formed by the heating in said heating zone are permitted to separate from unvaporized liquid oil constituents, maintaining a substantial superatmospheric pressure in said enlarged separating chamber, passing vapors and unvaporized oil constituents from said enlarged chamber into a second enlarged cracking chamber where a cracking temperature is maintained, removing the vapors from said second enlarged cracking chamber and subjecting them to fractionating conditions to produce a reflux condensate, a lower boiling gasoline condensate and uncondensible gases, passing unvaporized oil constituents from said second enlarged cracking chamber upon completion of the desired cracking thereof into a single vaporizing chamber maintained under a substantially lower pressure than that maintained in said second enlarged cracking chamber whereby substantial proportions of the unvaporized oil introduced into the vaporizing chamber and suitable as cracking stock are vaporized by its contained heat without further subjecting the said unvaporized oil to cracking conditions, removing the residue remaining unvaporized in said vaporizing chamber directly from the cracking system, removing the vapors from said vaporizing chamber and separately fractionating them under refluxing conditions to produce a relatively high boiling reflux condensate suitable as a cracking stock and a gasoline fraction, and conducting said reflux condensates to said long heating zone to be heated and subjected to cracking conditions.

DAVID G. BRANDT.